June 10, 1947.  F. W. GOETZE  2,422,009
SELF-SEALING RING-JOINT GASKET
Filed Nov. 5, 1945  3 Sheets-Sheet 1

INVENTOR:
FREDERICK W. GOETZE, DECEASED.
MARGIE C. GOETZE, EXECUTRIX
BY
ATTORNEY

June 10, 1947.    F. W. GOETZE    2,422,009
SELF-SEALING RING-JOINT GASKET
Filed Nov. 5, 1945    3 Sheets-Sheet 2
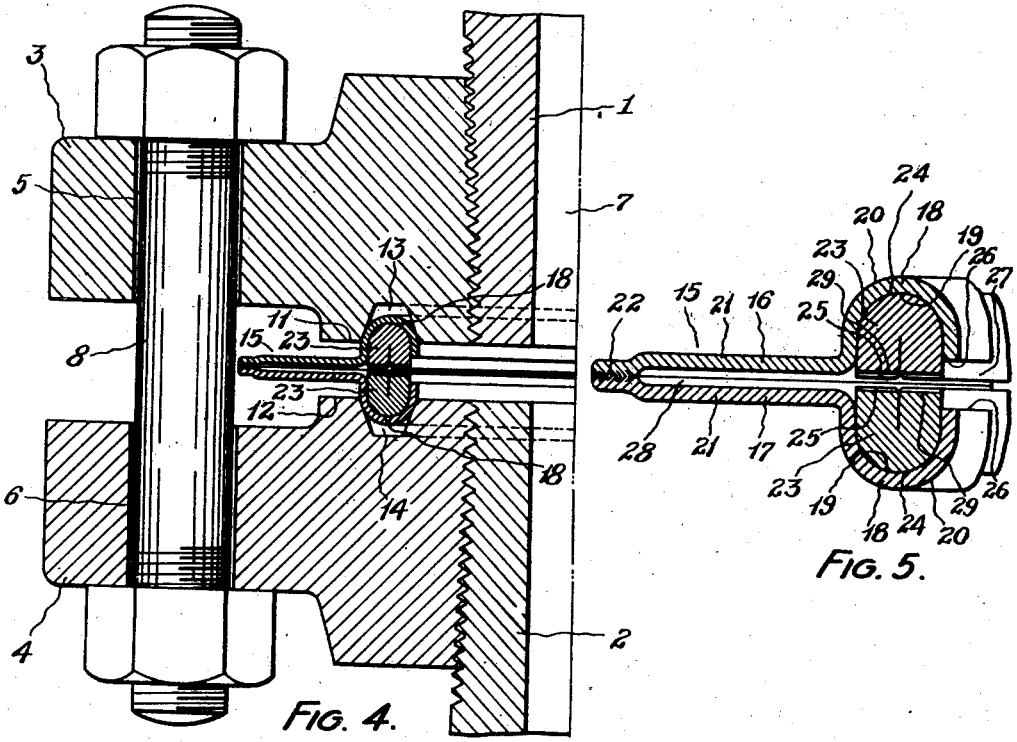
FIG. 4.
FIG. 5.
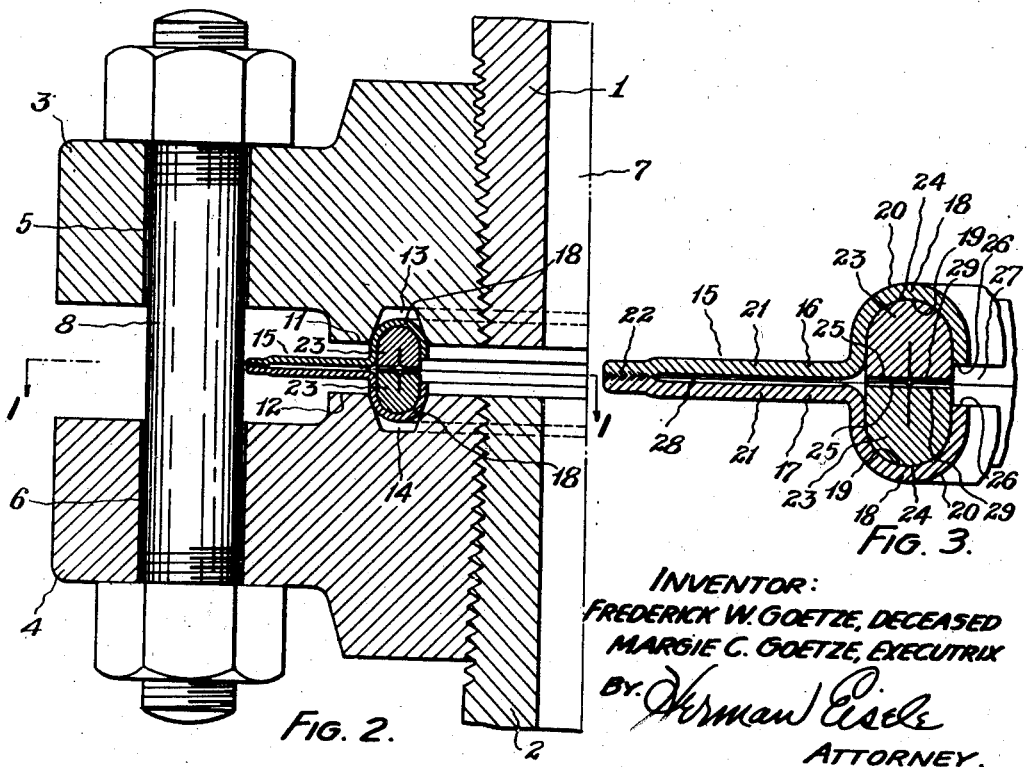
FIG. 2.
FIG. 3.
INVENTOR:
FREDERICK W. GOETZE, DECEASED
MARGIE C. GOETZE, EXECUTRIX
BY
ATTORNEY.

June 10, 1947.  F. W. GOETZE  2,422,009
SELF-SEALING RING-JOINT GASKET
Filed Nov. 5, 1945  3 Sheets-Sheet 3

INVENTOR:
FREDERICK W. GOETZE, DECEASED.
MARGIE C. GOETZE, EXECUTRIX.
BY Herman Eiele
ATTORNEY.

Patented June 10, 1947

2,422,009

UNITED STATES PATENT OFFICE 2,422,009

SELF-SEALING RING-JOINT GASKET

Frederick W. Goetze, deceased, late of Franklin Township, Somerset County, N. J., by Margie C. Goetze, executrix, Franklin Township, Somerset County, N. J., assignor, by mesne assignments, to Johns-Manville Corporation, New York, N. Y., a corporation of New York Application November 5, 1945, Serial No. 626,640

6 Claims. (Cl. 288—24)

This invention relates generally to gasket devices used for sealing joints formed in pressure piping or pressure vessels and relates more particularly to such gasket devices adapted to seal joints which confine fluids under extremely high temperatures and/or pressures.

More specifically this invention relates to gasket devices in the class commonly known as ring-joint gaskets or wedge-ring gaskets which devices include relatively rigid metal rings as elements and in which the sealing effect is produced by a wedging action of the rings into suitably shaped opposed grooves formed in the faces of the flanges with which the rings cooperate.

Ring-joint or wedge-ring gaskets, as generally manufactured, consist of solid rings of octagonal, elliptical, oval or other torroidal conformation in cross section. These rings are wedged, by means of bolts or other suitable clamping means, into a pair of opposed coaxial grooves formed in the joint flanges. The grooves are formed with converging sides and are accurately formed in the joint flanges either by machining or by grinding. The metal of which these solid ring-joint gaskets are generally made is preferably relatively non-corrosive, and is usually rare and expensive.

These ring-joint or wedge-ring gaskets are used for sealing fluids confined under pressures of several thousand pounds and/or temperatures approaching 1000° F., such as are encountered, for instance, in hydraulic installations, high pressure superheated steam systems, oil refinery service, and the like.

When the service for which these solid gaskets are used is considered, it will be manifest that these ring-joint gaskets and the grooves in the flanges with which they cooperate must necessarily be carefully machined to extreme accuracy and close tolerances and must additionally be provided with a high quality of smooth surface finish in order that an intimate uninterrupted sealing contact may exist between the gaskets and the grooves. These ring-joint gaskets, as heretofore manufactured, further require that the flanges or other joint members formed with ring-joint gasket engaging grooves, be of extremely heavy construction and that very heavy bolts be provided, not only to force the solid ring-joint gasket into sealing engagement with the grooves but to maintain this sealing engagement under all variations in pressures and temperatures and under all variations in external stresses imposed on the joint structure. It will also be evident that any slackening in the intensity of pressure between the flanges and the ring-joint gasket or any slight lateral movement of the two opposed flange faces of the joint forming structure, are likely to cause leaks which, at the tremendously high pressures, are extremely serious.

In practice, in a joint in which a solid metal ring type gasket is used, the bolts are drawn up to a stress considerably in excess of that required to seat the gasket in a sealing relation. This excessive tightening, beyond that required to seat the gasket, is carried out, (1) to resist the force tending to separate the flanges when the internal fluid pressure is applied to the joint, (2) to insure the existence of a balance of sealing pressure on the gasket to maintain a tight joint when the internal pressure is applied, (3) to allow for creep of the bolts, gaskets and flanges resulting from a tensioning of these parts under high temperature for long periods of time and (4) to insure maintenance of sufficient bolting effect in the event that relatively sudden changes in pressure or temperature cause contractions or expansions of the elements or in the event that external mechanical distortions, shocks or vibrations are imposed on the joint. In actual practice it is almost impossible to predict the amount of bolt stress required to insure a tight joint under the conditions outlined.

Furthermore it is not possible, in the great majority of installations, to accurately measure the actual stress imposed on the bolts in tightening and overstressing frequently results, with the consequent distortion of or breaking of the flanges or bolts or other severe damage to the joint or gasket.

In order to avoid the severe requirements in respect to heavy construction and exacting refinements pointed out with reference to present ring-joint or wedge-ring constructions, and in order to avoid the need for imposing excessive stresses on the joint parts, it is a prime object of this invention to produce a ring-joint gasket which serves the purpose of and satisfies the requirements of, a ring-joint seal and which does not require the massive construction of joint members and the imposition of extremely heavy clamping pressures to secure and maintain a tight seal under the most severe conditions of temperature and pressure and under the most extreme and sudden variations in these conditions.

It is a further object of this invention to produce a ring-joint gasket construction in which neither the gasket nor the associated joint members need to be finished to as close tolerances or as high quality of surface finish as are required for the solid ring-joint gaskets heretofore used.

It is a further object of this invention to produce a ring-joint gasket of this type which is self-sealing and in which an increase in the pressure of the confined fluid will automatically increase the pressure on the seal forming surfaces, as the pressure of the sealed fluid increases.

It is a further object of this invention to produce a gasket of this character which will permit a limited amount of axial separation and relative lateral shifting, in service, of the two juxtaposed joint flanges and grooves engaging the gasket, without danger of developing leaks.

It is a further object of this invention to produce a gasket of this character of which the parts can readily and rapidly be formed with dies by means of power press operations, thereby eliminating tedious and time consuming machining operations, and avoiding the need for complicated and expensive finishing machinery.

It is a further object of this invention to produce a ring-joint gasket which provides for ample accommodating movement or wiping action between the gasket and joint flange elements during the wedging and seating action which takes place when the flanges are drawn into sealing engagement with the gasket.

It is a further object of this invention to produce a ring-joint gasket which is more economical in the use of expensive metals than solid ring-joint gaskets of the type generally used at present.

It is a further object of this invention to produce a ring-joint gasket having the advantages pointed out and in which certain essential component parts of the gasket serve as a centering guide adapted to accurately position the gasket during installation with reference to the sealing surfaces in the flanges.

These and other objects may be obtained by the elements, parts, combinations and constructions constituting the present invention, preferred and modified embodiments of which are shown in the accompanying drawings and are hereinafter described in detail and claimed, which may be stated in general terms to include in a gasket construction, an annular bellows type of sheath hermetically sealed at its outer periphery and spaced apart interiorly thereof and formed adjacent its inner periphery with a pair of axially opposed interior alined annular grooves and corresponding exterior convex annular surfaces, and a pair of similar annular inserts normally contacting each other approximately on the median plane of the gasket, each insert being seated in one of the grooves in the sheath, the two inserts forming the equivalent of the ring-joint type of gasket in respect to its relative incompressibility and the bellows type of sheath forming a means for maintaining the inserts in proximate alined relation and also serving by confining the fluid pressure to force the inserts and convex surfaces of the sheath into increasingly tighter fluid sealing engagement with the grooves formed in the faces of the flanges associated with the gasket, as the pressure of the sealed fluid increases.

Referring to the drawings:

Fig. 1 is a fragmentary transverse section of a joint formed between adjacent ends of two alined pipes forming a conduit, the pipe ends being provided with companion flanges which are sealed by one form of the improved bellows type of ring-joint gasket embodying this invention, the gasket being shown partly in elevation and partly in section on a median plane thru the gasket, the plane of the section being indicated by line 1, 1 in Figure 2.

Fig. 2 is a fragmentary axial section of the joint shown in Fig. 1, this section being taken on the plane indicated by line 2, 2 in Fig. 1, the bellows type of ring-joint gasket sealing this joint being shown in a closed position, that is a position showing the relation of the parts at the conclusion of the assembling of the joint elements after the bolts have been drawn up to the required degree of tightness and prior to the imposition of any internal fluid pressure or loads on the joint of sufficient intensity to cause any relative change of position of any of the gasket or joint elements.

Fig. 3 is an enlarged view of the bellows type of ring-joint gasket illustrated in Fig. 2 and detached from the associated joint structure shown in Fig. 2.

Fig. 4 is a view of the parts illustrated in Fig. 2, the bellows type of ring-joint gasket being shown in a slightly open or axially expanded position (necessarily somewhat exaggerated), this position representing the effects on the joint parts caused by certain variations in pressure and/or temperature to which the joint is subjected, as will be hereinafter pointed out.

Fig. 5 is an enlarged view of the gasket as illustrated in Fig. 4, detached from the associated joint structure.

Figure 1:
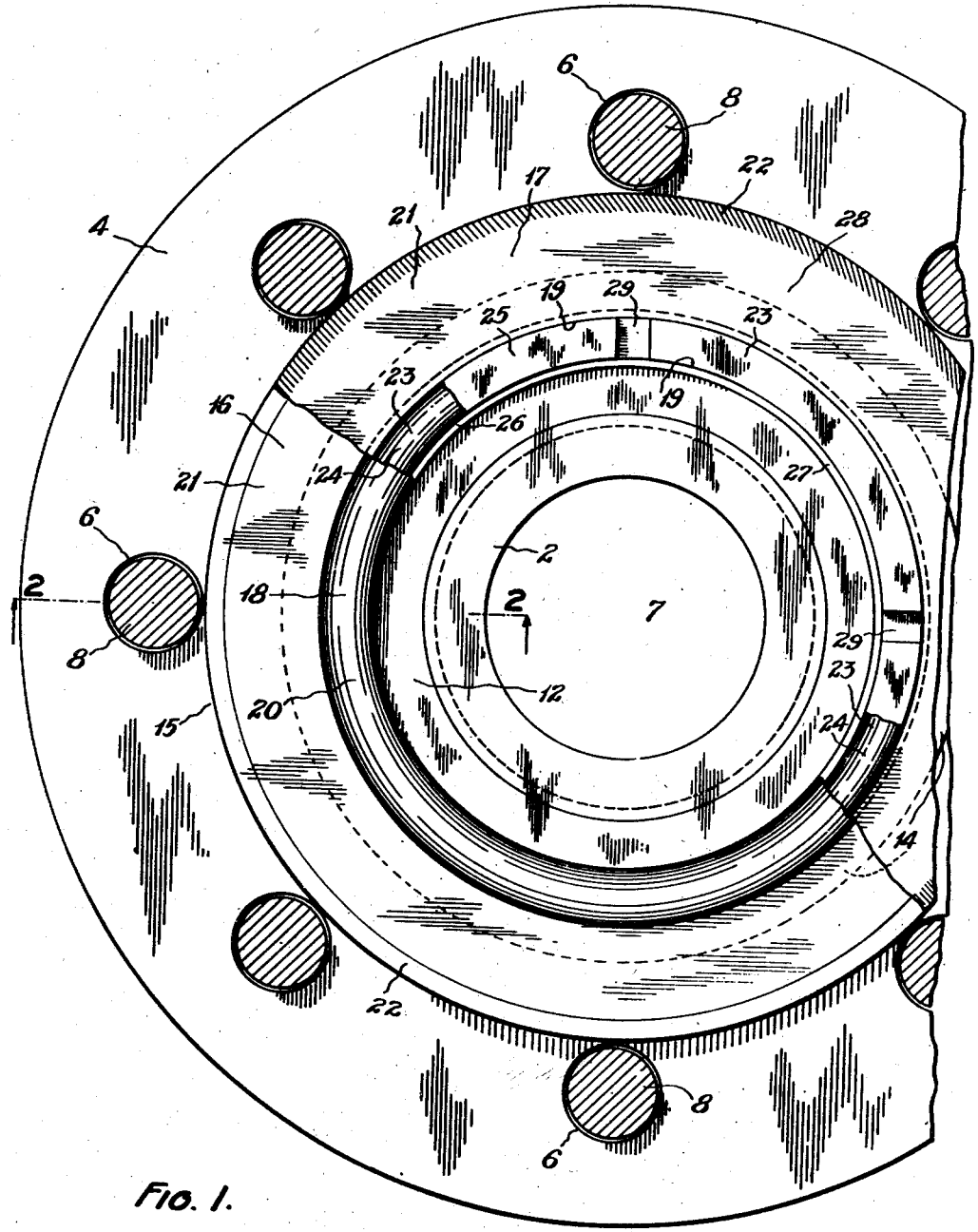

Fig. 6 is a view similar to Fig. 3 but illustrates a construction in which the bellows-like sheath is made on one integral piece of sheet metal, that is without a hermetically sealed connection at the outer periphery such as shown in disclosures in the preceding figures, and in which the opposed faces of the horizontally extending portions of the sheath are substantially in contact with each other along a median plane of the gasket, in the normal or free position of the gasket.

Fig. 7 is a view of a gasket similar to that shown in Fig. 6 also showing the sheath made on one integral piece of sheet metal but with the opposed faces of the horizontally extending portions of the sheath slightly spaced apart, and also showing an arrangement of certain radial grooves in the inserts or cores slightly different from that shown in Figures 1 to 6.

Fig. 8 is an inside edge view of the gasket shown in Fig. 7, this view being taken from a point on the axis of the gasket.

Fig. 9 is a view of a gasket similar to that shown in Figure 5, illustrating a modified type of weld used for hermetically sealing the outer peripheral edges of the sheath, and showing slightly modified inserts or cores enclosed in the sheath.

Fig. 10 is a view of the parts illustrated in Fig. 9 showing the position occupied by the parts when the gasket inserts or cores are spaced apart slightly as occurs under certain conditions in service.

Fig. 11 is a view of a gasket similar to that shown in Fig. 3, showing, however, the cores and sheath of octagonal cross sectional form.

In the following specification the term "axial," when used with reference to parts of the gasket or associated joint elements, is intended to indicate a direction parallel to or in the direction of the axis of the passage thru the gasket. The term "radial" is intended to indicate a direction transverse to the axis of the passage thru the gasket, that is, in a direction radial with respect to the center of the gasket and joint. The term "median plane" when used with reference to portions of the gasket is intended to indicate a plane perpendicular to the axis and passing thru the center of the gasket. The terms "radially outer" and "radially inner" are intended to indicate directions away from or toward the center of the gasket in a radial direction. The terms "axially outer" and "axially inner" are intended to indicate directions away from or toward the median plane of the gasket in an axial direction.

Referring first to the form of this invention illustrated in Figures 1 to 5, there are indicated fragmentarily at 1 and 2 opposed alined pipe sections having threaded connections with flanges 3 and 4, respectively, each formed with a plurality of registering bolt holes 5 and 6. As will appear, the pipe sections 1 and 2 form a substantially cylindrical passage or conduit 7 defined by the alined interior walls of the pipe sections 1 and 2. A plurality of suitable bolts 8 passing thru and loosely fitting in the holes 5 and 6 are adapted to advance the flanges toward each other, thus serving as a means for forcing the joint members into the proper engagement with the elements of the interposed gasket unit hereinafter to be described.

The flanges 3 and 4 are each formed with opposed annular substantially parallel faces 11 and 12 respectively, positioned next exteriorly of the pipe sections 1 and 2, and preferably interiorly of the bolts 8. Opposed annular coaxial grooves, indicated at 13 and 14 are formed in the annular face portions 11 and 12, respectively, of the flanges 3 and 4. These grooves may assume any one of various configurations in transverse cross section. In the form illustrated in Figures 2 and 4, these grooves are shown tapered in cross section with the side walls diverging toward the annular faces of the flanges in which they are formed.

The construction of the improved self-sealing ring-joint gasket will be best understood by reference to the plan view, Figure 1 and transverse sections, Figures 2 and 3. This gasket consists of an annular bellows or double diaphragm type of sheath, enclosing and conforming, in part, to the axially outer contour of a pair of juxtaposed relatively hard annular inserts or cores.

The annular bellows type of sheath is preferably made of sheet metal and is indicated in its entirety at 15 and is formed in the embodiment illustrated in Figures 1 to 3, of a pair of preferably identical annular sheath or bellows elements 16 and 17.

The sheath elements 16 and 17 are most conveniently produced in dies. Each sheath element is shaped, adjacent its radially inner periphery, into the conformation of an annular corrugation 18 forming an annular groove 19, interiorly of the sheath, and an annular convex surface 20 exteriorly of the sheath. Extending radially outwardly from the corrugation 18 on each sheath is a substantially flat annular web or diaphragm section indicated at 21. The sheath elements 16 and 17 are superposed one upon the other in coaxial relation and secured together at their outer periphery with the grooves 19, 19 of the elements facing each other, as clearly appears in Figures 2 and 3. The method of securing the two sheath elements together is optional and may be effected by seaming, brazing, welding or any other desired method which insures the formation of and maintenance of a hermetic seal under the extreme conditions of temperature and pressure to which the gasket is to be subjected. In the embodiment disclosed in Figures 1 to 5, the method of securing the sheath elements together is shown to be an electric resistance weld 22, the peripheral edges of the webs being, for this purpose, slightly offset toward each other from the plane of the remaining portion of the web 21 and forming a slight space 28 between the webs or diaphragm sections 21, 21 when the edges are secured together.

Seated in the grooves 19, 19 are a pair of annular inserts or cores 23, 23, these cores being, in the embodiment disclosed, identical in inner and outer diameter and similar in cross section. These cores contact each other substantially on the median plane of the gasket where they are each formed with a generally flat surface 25. On the side away from the median plane, that is on their axially outer faces, the cores 23 are each formed with a convex surface 24. The convex surfaces 24 are accurately produced, preferably by means of dies, to substantially the same conformation as the grooves 19, in order that the cores may snugly seat or nest within the grooves 19, 19. In practice, the radial width dimension of the cores is preferably made slightly greater than the radial width of the grooves in the sheath in order that the cores may engage the grooves in the sheath with a tight friction fit.

The overall axial dimension of the groove 19 in the sheath element is nearly the same but preferably slightly less than the axial height of the cores, in each case, in order that the sheet metal which forms the corrugation on each sheath element may enclose the core almost completely. The edges 26, 26 forming the radially inner terminals of the corrugations 18, 18 are accordingly spaced apart as shown in Figures 2 and 3, forming an annular opening, indicated at 27, when the cores 23, 23 are in contact with each other. The opening 27 serves to insure access of the fluid pressure in the conduit to the inner walls of the cores 23, 23 particularly at the median plane in which the flat faces 25, 25 of the cores contact each other. The radially outer walls of the corrugations 18, 18 cover the outer sides of the cores 23, 23 and flare into the diaphragm sections, in the embodiment illustrated in Figures 1 to 3. The cores or inserts 23, 23 are each formed with a plurality of radial grooves indicated at 29, 29 providing free communication between the diaphragm space 28 and the passage 7 interiorly of the pressure conduit when the faces 25, 25 are in contact with each other.

The inserts or cores 23, 23 may be formed in any desired manner as by machining, forging, stamping or by a combination of these methods. They are, however, preferably formed from flat sheet metal in suitable dies by means of a power press by a series of successive blanking, forming, curling and coining operations. The metal from which the cores are made is preferably of relatively inexpensive steel which is hardened by the cold working operations to which the cores are subjected in the press operations.

The sheath elements 16 and 17 are preferably made from relatively thin sheet metal in a power press by blanking and forming operations in suitable dies, both elements being made in the same dies. The sheath is preferably made of metal softer than the metal used for the cores. In some cases soft steel will be satisfactory, but in those cases where a corrosion resisting material is required, other metals such as stainless steel, monel metal, bronze, brass, etc., may be utilized.

In the producing of this improved ring-joint gasket unit the preferred sequence of steps used is as follows: The sheath element or diaphragm sections 16 and 17 are each formed in blanking and forming dies. The inserts or cores 23, 23 are made in suitable blanking, forming, curling and coining dies. A core 23 is then inserted and positioned in each of a pair of sheath elements, whereupon the two sheath elements are assembled with the cores facing each other and are held in suitable fixtures adapted to substantially aline and maintain the two sheath elements in coaxial relation and to hold the faces 25, 25 of the cores and the outer peripheral edges of the sheath elements respectively, in contact with each other, in which position the two sheath elements are welded together at their outer periphery.

The assembling of this ring-joint gasket in the joint to be sealed proceeds as follows: The flanges 3 and 4 are first separated until the space between the opposed faces 11 and 12 of the flanges, between which the gasket is to be inserted, is greater than the overall thickness of the gasket in an axial direction. The gasket is then slid or dropped in between the flanges depending on whether the axis of the conduit is vertical or horizontal, two or more bolts 8 having preferably been inserted in the bolt holes to serve as stops or guides against which the periphery of the gasket will abut, thus insuring the proper positioning of the convex surfaces 20, 20 of the gasket coaxially with the grooves 13 and 14 in the flanges. The gasket having been properly positioned between the flanges, the remaining flange bolts 8 are inserted in the bolt holes and are drawn up in successive around the joint until all bolts are strained equally to the predetermined extent, at which time the surfaces 25, 25 of the cores 23, 23 will be in close contact with each other and the convex surfaces 24, 24 of the cores will be snugly seated in the grooves 19, 19 and the convex surfaces 20, 20 of the sheath will be in pressure sealing engagement with the axially outwardly converging side walls of the grooves 13 and 14. For reasons which will be hereinafter explained, it is not essential that the bolts be drawn up with any exceedingly heavy initial strain, as a strain insuring a continuous intimate contact around the entire periphery between the groove walls and the outer convex surfaces of the sheath is sufficient, as will be explained.

Pursuant to the assembling procedure just described, and prior to the imposition of internal pressure or temperature upon the joint, the gasket and joint parts assume the position illustrated in Figures 2 and 3.

When a moderate internal pressure is developed in the conduit 7, the pressure sealing engagement of the convex surfaces 20, 20 of the sheath with the walls of the grooves 13 and 14 is amply sufficient to prevent leakage. Any substantial increase in internal pressure developed within the passage 7 instantaneously exerts a pressure on the axially inner faces 25 of the cores 23, thus forcing the cores outwardly in an axial direction in proportion to the intensity of the pressure. This axially outward pressure is transmitted by the cores against the corrugation in the sheath and causes the convex surfaces 20, 20 of the sheath elements 16 and 17 to more intimately seat in the grooves 13 and 14.

The pressure originating in the passage 7 also passes into the open space 28 between the diaphragm portions 21, 21 of the sheath elements, passing into this space thru the radial grooves 29. It is here noted, however, that these grooves are not always essential as the pressure very easily seeps between the contacting faces 25 of the cores to the space 28 unless the two contacting faces 25 should temporarily adhere together in which case the opposed axially directed pressures on the surfaces of the grooves 29 serves to force the cores apart. The enclosed fluid pressure, of course, also acts on the terminal edges 26 of the sheath at its inner periphery. The pressure in the space 28 and the pressure exerted on the inner periphery of the terminal edges 26 and the pressure acting on the faces 25 of the cores all cooperate to force these gasket elements axially outward from the median plane of the gasket and to force the convex surfaces 20, 20 into intimate engagement with the grooves 13 and 14.

A position of the parts when the fluid pressure is exerting its full effect on the parts of the joint is illustrated in Figures 4 and 5 where the cores 23, 23 and the inner peripheries of the sheath elements 16 and 17 are shown forced apart as a result of the imposition of an extremely high pressure on the joint. In the absence of great initial strain in the bolts, the imposition of this pressure normally results in a slight elongation of the bolts 8 which permits the slight axial outward movement of the gasket parts from the median plane of the gasket, the extent of the opening being slightly exaggerated in Figures 4 and 5, for purposes of clearness in the drawing, as will be understood.

When the imposition of this pressure is accompanied by high temperature, or when variations in temperature occur, still further distortions take place in the gasket parts, in the flanges, and in the bolts.

Further distortions in gasket or joint parts may also result from a lag in the transmission of the temperature from the interior of the conduit to the outer joint parts. Such a lag may occur, for example, in the event that a sudden drop in temperature takes place in the conduit causing the gasket and flanges to cool and contract before the bolts have cooled sufficiently to contract in the same proportion as the gasket and flanges, and Figure 4 may be assumed to illustrate the relative position of the parts under these circumstances.

Likewise external mechanical longitudinal or transverse stresses may be imposed on the conduit or joint parts, which tend to distort the joint parts; but regardless of the distortion which takes place, the internal pressure within the gasket maintains the convex surfaces 20, 20 of the sheath element in intimate fluid sealing engagement with the grooves 13 and 14 and it has been found that this self sealing bellows type of ring-joint gasket construction is especially advantageous in installations subject to shock or vibration.

Due to the relative softness of the metal of the sheath compared with the metal of the flanges and with the metal of the cores, it will be clear that the sheath at its point of engagement with the grooves readily conforms to the general contour of the grooves and to the local surface irregularities of the grooves and cores, even to the extent of deforming slightly in producing an effective pressure sealing engagement with the grooves in the flanges. Under some circumstances, in fact, tool marks on the cores or in the grooves are an advantage as they tend to improve the sealing bond or binding between the metal of the sheath and the relatively harder metal of the cores and flange grooves.

It will also be clear that, due to the capacity of the sheath to conform to minor irregularities in the flange grooves and core surfaces, the need for precision accuracy in the finish of flange grooves or joint elements is avoided, as a result of which the parts may be produced more rapidly and with more simple machinery.

During the bolting up action it will be clear that the sheath, being interposed between the relatively hard flange grooves and cores, will permit the ample localized or general slipping or wiping action between the sheath and the grooves or between the sheath and the cores with the result that the cores may position themselves within and accommodate themselves to the grooves without the imposition of any considerable unbalanced strain on either cores or grooves; in other words, the hard cores may be said to be free to float inside of the sheath during the bolting up operations.

The two cores and core enclosing sheath corrugations in the gasket are free to slightly shift laterally relatively to each other, restricted only by the relatively slight resistance which may develop in the relatively resilient or pliable web or diaphragm of the sheath. A slight bulging in an axial direction which occurs in the diaphragm web portion of the sheath under pressure reduces the resistance of this web portion to relative lateral shifting of the two corrugations. In the event that the two opposed flanges and/or grooves are slightly laterally misalined, each core and associated corrugation in the sheath will be free to move laterally into the most effective seat in its associated groove, without any serious restraint from the groove in the opposed flange and without any substantial unbalanced or eccentric load on the cores.

It will be apparent that the intensity of the pressure sealing engagement between the convex surfaces 20, 20 of the sheath and the walls 13 and 14 produced by the pressure of the sealed fluid, will increase with an increase in the pressure of the sealed fluid, that is it will automatically vary with the pressure of the sealed fluid and will be in proportion to the need for tightness of the sealing effect required. It will also be evident that this sealing effect will obtain regardless of a limited axial separation or relative lateral shifting in service of the two juxtaposed flanges.

It will further be evident that this invention does not require the massive construction of flanges and bolts which is necessary with the present ring-joint gasket types of construction in which the bolts and flanges must continuously maintain a perfect sealing engagement under all conditions of temperature and pressure, unaided by any compensating pressure from the sealed fluid.

It is to be noted that the construction just described requires at most one weld and that weld is located at the outer periphery in a position where it will be least effected by any weaving action incident to the movements of gasket or joint parts. This weld is also located so far from the hardened steel core that any heat transmitted to the core during the welding operation will not anneal or otherwise effect the hardness of any portion of the cores.

As stated above, the cores are originally made for a snug friction seat in the grooves of the corrugations and the intimacy of the contact between the core and the sheath is increased as a result of the pressure and temperature conditions to which the gasket is subjected in the assembling and in service. It is noted, however, that the original snug fit of the core in the sheath is not always essential as cores with relatively loose original fits in sheaths were found to be tightly seated in the sheath after assembling and short periods of service under the high pressure and temperature.

This self sealing or bellows type of ring-joint gasket may be modified in a number of ways within the scope of this invention and a few of these modifications are shown in Figures 6 to 11.

Figure 6 illustrates a modified form of this invention in which the sheath is formed of a single piece of sheet metal instead of two identical pieces welded together at the outer periphery, as in the hereinbefore described form of gasket. This sheath is illustrated in its entirety at 30 and comprises an upper sheath portion 31 and a lower sheath portion 32. Each of the sheath portions is shaped, adjacent its inner periphery, into the conformation of an annular corrugation 33 forming an annular groove 34 interiorly of the sheath and an annular convex surface 36 exteriorly of the sheath.

Extending radially outwardly from each corrugation 33 is a flat annular web or diaphragm section indicated at 37. The sheath portions 31 and 32 are formed from a single piece of sheet metal folded upon itself at the outer periphery of the diaphragm sections 37, 37 as shown at 38, thus forming a continuous closed peripheral edge. Seated in the grooves 34, 34 are a pair of annular inserts or cores 39, 39 generally identical with and produced in the same manner as the cores 23, 23, hereinbefore described. These cores are snugly seated within the grooves 34, 34 in the sheath portions 31 and 32 and otherwise bear the same relation to the corrugations as in the first above described form of this invention.

In the modification illustrated in Fig. 6, the cores are inserted and permanently enclosed within the sheath during the sheath forming operation. It is to be noted that in this modification, no open space is provided between the sheath diaphragm sections 37, 37, corresponding with the space 28 in the first described form of gasket. This space 28 is not essential, however, as the fluid pressure quite quickly penetrates the area of contact between the diaphragm sections. The omission of this open space is desirable in those applications where the confined fluid tends to have a deteriorating action on the metal of the sheath. In that event it is desirable that the bellows remain entirely closed in the unexpanded position leaving a minimum space for the confined media.

Figures 7 and 8 illustrate another form of this invention generally similar to the modification illustrated in Figure 6 which comprises a sheath 40 generally similar to the one piece sheath 30 just described comprising upper and lower sheath elements 41 and 42 respectively, each including a corrugation 43, 43 and diaphragm sections 44, 44 integrally forming an outer periphery 45. This sheath is formed with a slight space 46 between the two diaphragm sections 44, 44. Nested within the grooves formed in the corrugations of the upper and lower sheath elements are a pair of cores 47 and 48 generally similar to the previously described cores and bearing the same relation to the corrugations as in the previously described forms of this invention. The cores 47 and 48 differ, however, from the previously described cores in respect to the abutting faces on the median plane of the cores. The lower face of the core 47 is formed with a radial groove 49 while the upper face of the core 48 is formed with an uninterrupted smooth face. The radial groove in one of the cores has been found to be completely ample in many installations, to quickly transmit the fluid pressure between the cores and into the space 46.

The form of the invention illustrated in Figures 9 and 10 comprises a sheath 50 formed of two similar stampings 51 and 52 each formed with a corrugation 53 and a radially outwardly extending web or diaphragm section 54, the diaphragm sections 54 being sealed together at their outer peripheries by means of an arc weld as shown at 55. Seated in the corrugations 53, 53 of the upper and lower sheath portions 51 and 52, are a pair of cores 56 and 57, respectively. These cores are generally similar in conformation and bear the same relation to the corrugations as in the previously described forms of this invention. These cores 53, 53 however, are formed of solid metal instead of sheet metal as in the case of the previously described cores. These solid cores are preferably made by a forging and/or machining operation and a final coining or sizing operation. The core 56 is preferably provided with a radial groove 58 on its lower face, providing ready access of fluid pressure to the area between the cores and between the diaphragm sections 54, 54. The position of the parts of this gasket when subjected to high fluid pressure is clearly indicated at Fig. 10.

Fig. 11 shows a gasket embodying this invention in which the portions adapted to cooperate with the grooves in the flanges are, as a whole, octagonal in transverse section. This form of the invention includes a sheath 60 comprising upper and lower sheath portions 61, 62, each formed with an annular trough like corrugation 63, having a flat axially outer surface 64 and axially outwardly converging side portions 65, 65, the outer surfaces of these converging sides being adapted to form sealing engagement with the walls of correspondingly converging grooves in flanges, not shown, but generally similar to the flanges illustrated in Figures 1 to 5. Extending radially outwardly from the corrugations 63, 63 are diaphragm sections 66, 66 hermetically connected together at the outer periphery by a resistance weld 67. The diaphragm sections 66, 66 are slightly spaced apart to form an intervening space 68. Seated within the groove 63, 63 are a pair of cores 69, 69 of the same general conformation in transverse section as the corrugations 63, 63 in which they snugly nest. The cores 69, 69 as illustrated, are made by a series of blanking, forming, curling and coining operations in suitable dies.

In all of the above disclosures, the sheaths and cores have been shown and described as annular in form. It will be clear however, that this invention in its broader aspects, is not limited to an annular or circular gasket but may be embodied in any other closed form such as elliptical, oval or any other endless conformation and it is intended that the term "annular" as used in the claims may be accordingly interpreted broadly.

Many other modifications of this invention and its application in addition to those shown, will naturally occur to those skilled in this art, and the present disclosures should therefor be considered as typical only, and applicant desires not to be limited to the exact construction shown and described.

In the foregoing description also, certain terms have been utilized for brevity, clearness and understanding; but no unnecessary limitations should be implied therefrom because such words are utilized for descriptive purposes herein and not for the purpose of limitation, and are intended to be broadly construed.

What is claimed is as follows:

1. A gasket construction of the character described, comprising a pair of ring-like core members disposed in face to face relation with their openings axially alined and with their axially outer surfaces having convex shape, and a bellows type of sheathing enclosing said core members, said sheathing having a pair of walls formed with openings axially alined with the openings in said core members, and each wall having an inner marginal portion disposed axially exteriorly about the convex surface of one of said core members and having a portion extending radially outwardly from said opening and terminating in an outer margin, said outer margins of the two walls being hermetically connected together.

2. A gasket construction of the character described, comprising a pair of axially juxtaposed ring-like core members each having an axially outer surface of convex shape, and a bellows type sheathing enclosing said core members and having walls defining openings in axial alinement with the openings of said core members, said walls being hermetically connected along portions radially remote from said openings and having radially inner portions free to move adjacent to said openings, the movable portion of each of said walls having a radially outwardly convex inwardly opening corrugation enclosing one of said core members.

3. A gasket comprising in combination an annular sheet metal sheath and a pair of solid annular cores substantially enclosed within the sheath, the cores being of the same diameter and each being formed on its axially inner face with a flat surface substantially square with the axis of the cores and on its axially outer face with a convex surface, the sheath being formed with a pair of walls having substantially central opposed coaxial grooves of substantially the same conformation as the convex surfaces of the cores and being provided with an annular substantially central opening in each wall and with a hermetically closed connection between the outer peripheries of the walls.

4. A gasket construction of the character described, comprising a pair of annularly-shaped core members, solid in cross-section, and normally substantially engaging each other in face to face relation substantially on a median plane thru the gasket, with their openings axially alined and with their axially outer surfaces having convex shape, and a pair of sheathing walls, hermetically connected together radially exteriorly of the core members, and having radially inner portions formed with axially outwardly extending grooves frictionally embracing the core members.

5. A gasket construction adapted for use between adjacent ends of axially alined conduit members of a pressure line, comprising a pair of walls having axially disposed apertures axially alined to permit communication between said conduit members, the outer marginal portions of said walls being hermetically connected, and the inner marginal portions of said walls being free to move with respect to each other in axial directions, the inner marginal portion of each wall having formed therein an outwardly convex inwardly opening seat surrounding the aperture in said wall, and a pair of separate core means of material harder than the walls of said gasket each having an axially outer surface conforming to one of said seats frictionally held therein and movable therewith.

6. A gasket comprising in combination an annular relatively soft sheet metal sheath and a pair of relatively hard juxtaposed annular cores enclosed within said sheath, said sheath comprising a pair of substantially parallel spaced wall portions hermetically connected together adjacent their outer peripheries and formed on their interior surfaces adjacent their inner peripheries with axially opposed annular grooves extending in opposite directions from the median plane of the sheath, the pair of cores each having its axially outer face of convex conformation in transverse section and seated in one of said grooves, the axially inner faces of said cores being adapted to engage each other, and means in at least one of said cores providing a radial passage when the said inner faces of said cores are in engagement with each other.

MARGIE C. GOETZE,
*Executrix of the Estate of Frederick W. Goetze, Deceased.*

REFERENCES CITED

The following references are of record in the file of this patent:

UNITED STATES PATENTS

| Number | Name | Date |
|---|---|---|
| 1,904,250 | Purvis | Apr. 18, 1933 |
| 836,950 | Wilcox | Nov. 27, 1906 |
| 2,291,709 | Goetze | Aug. 4, 1942 |
| 2,401,923 | Gleeson | June 11, 1946 |
| 2,384,672 | Gleeson | Sept. 11, 1945 |
| 1,715,854 | McKenzie et al. | June 4, 1929 |

FOREIGN PATENTS

| Number | Country | Date |
|---|---|---|
| 614,140 | Germany | June 3, 1935 |